Patented Apr. 14, 1936

2,037,111

UNITED STATES PATENT OFFICE 2,037,111

CHEMICAL PROCESS FOR THE PREPARATION OF WHITE BEESWAX FROM CRUDE BEESWAX

Charles Stewart Bisson and Walter Brown Dye, Davis, Calif.

No Drawing. Application January 2, 1935, Serial No. 177

1 Claim. (Cl. 134—19)

This invention relates to the process of preparing white beeswax from crude beeswax by means of solutions of alkali metal salts, alkali metal hydroxides, and alkali metal hypochlorites, and has for its object to prepare a pure white beeswax directly from the crude beeswax by a more generally adaptable procedure, and one which has less injurious effect on the chemical composition and properties of the beeswax than other chemical processes.

In whitening the wax, the crude beeswax is added to a volume of water approximately 3 or 4 times the volume of wax and the water and floating wax is heated to a temperature above the melting point of crude beeswax, approximately 90° C. The water should be as free as possible from alkaline earths and iron. An alkali metal hydroxide, such as sodium hydroxide, is then added to the melted wax over the alkali metal salt solution, while being stirred, in such amount as to bring the pH of the solution above 7, and at the same time keeping the temperature within a range which will not permit the wax emulsion from being completely dispersed through the water phase. An alkali metal salt, such as sodium chloride, is added to the water to aid in preventing the wax from being completely dispersed throughout the whole volume of the water.

This causes water and alkali soluble coloring matter to be dissolved by the aqueous phase. By stirring the emulsion mixture, and cooling, the colored solution separates and is then drawn off at temperatures above 60° C. The washing process with salt and alkali is repeated several times at temperatures above 60° C. until no more colored material can be leached from the wax paste. By this means a large part of the coloring matter is removed and the amount of oxidizing agent required to finally whiten the wax paste is diminished.

The partially decolorized wax paste produced by the above procedure is then added to a volume of water approximately 3 or 4 times the volume of the wax paste, and containing an alkali metal salt such as sodium chloride. The temperature of the mixture is then raised to near its boiling point and freshly prepared alkali metal hypochlorite solution (sodium hypochlorite solution) is then slowly added with thorough stirring in sufficient quantity to produce a white wax emulsion. The mixture is then allowed to stand, and then cooled and stirred to cause the water to separate, adding salt, such as sodium chloride, if necessary. Here again the purpose of the alkali metal salt is to prevent the dispersion of the wax emulsion throughout the entire volume of the water. The spent liquor is then drawn off from the pure white wax paste and the white paste is remelted over water up to 85° C. to remove any salts.

The washed white wax paste resulting from the above procedure is then melted over a small amount of water and then de-emulsified by adding an alcohol, such as amyl alcohol, or by lowering the pH of the solution over which the white wax paste is melted. The temperature is kept considerably below the boiling point in order to aid the de-emulsification. The white wax is then drawn off and cast, after all water has been removed.

We claim:

The hereindescribed process of purifying crude beeswax, which comprises melting crude beeswax in direct contact with an aqueous alkali metal salt—alkali metal hydroxide solution thereby extracting from the wax the alkali soluble impurities, cooling and separating the wax from the aqueous solutions, again melting the wax in contact with a second aqueous alkali metal salt solution and adding an alkali metal hypochlorite solution while stirring the mass, cooling and separating the purified wax product from said second solution.

CHARLES STEWART BISSON.
WALTER BROWN DYE.